United States Patent [19]
Martin, Jr.

[11] 3,823,962
[45] July 16, 1974

[54] LUNETTE ASSEMBLY

[75] Inventor: Raymond D. Martin, Jr., Centreville, Md.

[73] Assignee: Centreville Tag-A-Long Trailers, Inc., Centreville, Md.

[22] Filed: Aug. 24, 1973

[21] Appl. No.: 391,474

[52] U.S. Cl. .......................... 280/514, 280/491 E
[51] Int. Cl. ........................ B60d 1/04, B60d 1/14
[58] Field of Search.... 280/504, 514, 515, 507–510, 280/490 A, 491 E, 511

[56] References Cited
UNITED STATES PATENTS

| | | | |
|---|---|---|---|
| 2,152,175 | 3/1939 | Carpenter | 280/511 |
| 2,202,867 | 6/1940 | Rankin | 280/508 |
| 3,414,295 | 12/1968 | Rendessy | 280/511 UX |

FOREIGN PATENTS OR APPLICATIONS

| | | | |
|---|---|---|---|
| 502,287 | 2/1920 | France | 280/504 |
| 1,061,010 | 11/1953 | France | 280/504 |
| 568,862 | 4/1945 | Great Britain | 280/504 |
| 623,434 | 5/1949 | Great Britain | 280/511 |

Primary Examiner—Robert S. Ward, Jr.
Attorney, Agent, or Firm—Graybeal, Barnard, Uhlir & Hughes

[57] ABSTRACT

A lunette member having a forward eye portion, a rear shank, and an intermediate plug portion interconnecting the shank and the eye. The intermediate plug portion has a transverse cross sectional configuration of a square, and fits in a mating square through socket formed in a mounting member of a trailer tongue. The base of the eye portion is thickened in both transverse directions, forming a rearwardly facing shoulder that engages the forward face of the mounting member. A lock nut retains the lunette on the mounting assembly.

15 Claims, 4 Drawing Figures

PATENTED JUL 16 1974     3,823,962

3,823,962

LUNETTE ASSEMBLY

BACKGROUND OF THE INVENTION

1. Field of the Invention

The present invention relates to a lunette assembly by which a trailer is towed by a matching pintle or hook of a towing vehicle.

2. Description of the Prior Art

A common way of towing a trailer is by means of a pintle-lunette connection, with the lunette being usually attached to the tongue of the trailer and the pintle being attached to the towing vehicle. The general style of lunette that is widely used in present day trailers is commonly employed in an assembly such as that shown in FIG. 1, which is identified in the accompanying drawing as prior art. It is believed that the features of the present invention will be better appreciated by discussing in some detail the nature of this prior art lunette assembly and the problems associated with the same.

This prior art lunette assembly, generally designated 10, comprises a lunette 12, made up of a forward eye portion 14 and a rearwardly extending threaded shank 16. A nut 18 and lock washer 20 secures the lunette 10 to the trailer tongue (not shown). This type of lunette generally requires a safety bolt, indicated at 22, with an associated nut 24 and lock washer 26, and also an associated accessory plate 28. The shank 16 of the lunette 12 extends through an associated hole in the plate 28, with the neck portion of the lunette 12 being welded, as at 30, to the plate 28. The safety bolt 22 extends through a second hole 32 in the plate 28, and also connects to the trailer tongue.

One of the intended functions of the weld 30 is to prevent the lunette from turning in the plate 28. However, one of the problems associated with this prior art assembly is that the shank 16 of the lunette 12 sometimes breaks just aft of the weld, with the eye portion 14 remaining attached to the plate 28 through the weld 30. This places the entire loading from the eye 14 through the plate 28 and bolt 22 into the trailer tongue. Unfortunately, under this loading the accessory plate 28 bends and then eventually snaps, which results in the complete failure of the lunette assembly 10. It has been the experience of the applicant herein that this problem of too frequent breakage of lunette assemblies has been with the trailer and trailer accessory manufacturing industry for a number of years. One possible solution is, of course, simply to make the component parts larger, and hence impart greater over all strength. However, with weight limitations on trailers, and also a highly competitive cost picture involved, this is not over all a desirable solution.

Another factor to be considered in the construction of lunettes and lunette assemblies is the nature of the loads which are involved. First, there is the longitudinal or pulling load exerted by the towing vehicle, which results in the eye of the lunette transmitting tensile loading to the shank of the lunette, which in turn imparts a towing force to the trailer. In addition to this pulling force, there are substantial lateral forces imparted to the eye of the lunette, which in turn cause substantial shear and torsional stresses between the eye and shank of the lunette. Such lateral loading can result, for example, from the trailer going off the shoulder of the road or traveling over vertical obstructions such as railroad tracks. Also, such loading can occur in a horizontal plane when the trailer is being maneuvered and a jackknife position occurs. Further, in over the road travel, various jolts are imparted to the towing vehicle and the trailer which causes transverse shock loads to be imparted along various directions.

In view of the foregoing, it is an object of the present invention to provide an improved lunette and lunette assembly to accomplish reliably its intended towing function with damage and breakage being less than that commonly experienced by the prior art devices.

SUMMARY OF THE INVENTION

The present invention comprises a lunette and also an assembly incorporating such lunette. The lunette of the present invention is substantially unitary and comprises a forward eye portion, a rear shank portion and an intermediate plug portion. The forward eye portion has an expanded (i.e., reinforced) base having a rearwardly facing shoulder. The plug portion has a circularly irregular, substantially uniform cross section and rigidly interconnects the eye portion to the shank.

In the lunette assembly, there is a lunette mounting member which is attached to or is part of the trailer tongue. The lunette mounting member has a forward face, a rearward face and a longitudinally aligned, circularly irregular through socket extending from its forward face to its rear face, and arranged to interfit in mating relationship with the plug portion of the lunette. Lock nut means engaging the shank of the lunette bring the shoulder of the eye of the lunette into contact with the forward face of the mounting member, with the lock nut means bearing against the rear face of the mounting member.

In operation, the shank of the lunette receives the main force of the longitudinal or pull loads exerted on the lunette. The plug portion of the lunette resists any turning of the lunette in the trailer mounting. The major vertical and lateral shearing and torsional loads are imparted primarily into the base portion of the lunette eye and into the plug portion of the lunette. It has been found that the lunette of the present invention is well adapted to be made as a casting, and in the configuration of the present invention is able to withstand the various loads imparted thereto in use.

DESCRIPTION OF THE PREFERRED EMBODIMENTS

Figure 1:
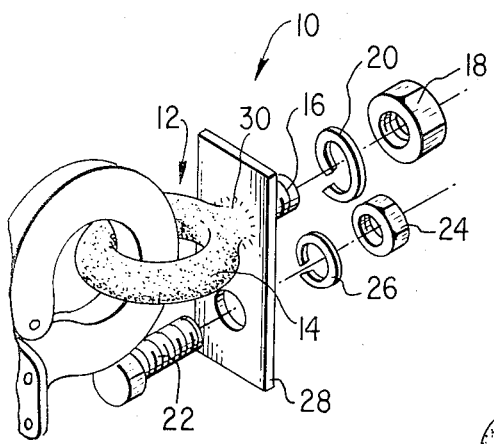
FIG. 1 is an exploded isometric view of a prior art lunette assembly in common present day use.
Figure 2:
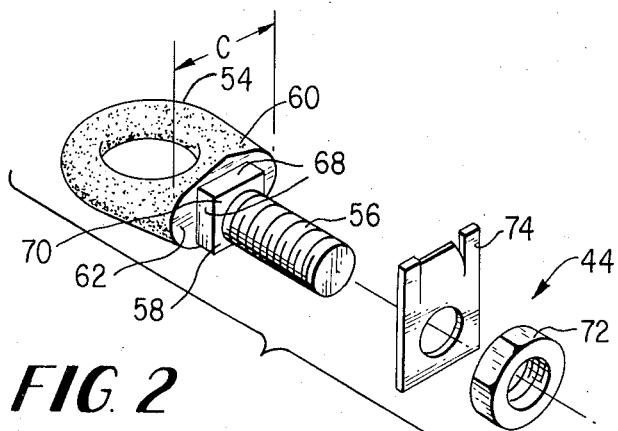
FIG. 2 is an isometric view of the lunette of the present invention with its associated lock nut means.
Figure 3:
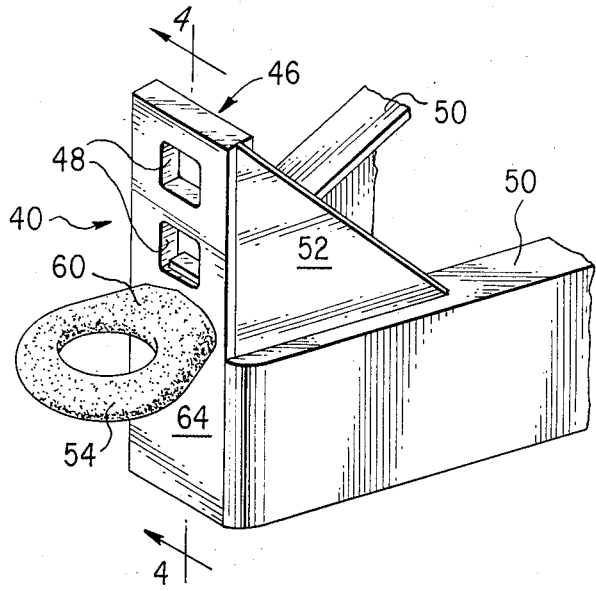
FIG. 3 is an isometric view illustrating the lunette assembly in operating position.
Figure 4:
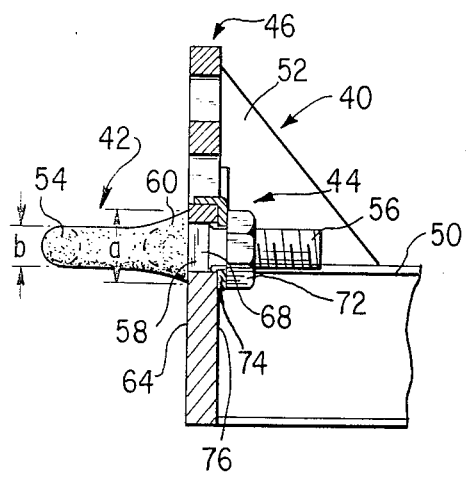
FIG. 4 is a longitudinal sectional view taken along line 4—4 of FIG. 3.

As indicated above, the present invention is shown in FIGS. 2–4, while FIG. 1 illustrates a typical prior art lunette assembly in wide present day use.

The lunette assembly of the present invention, generally designated 40, comprises a lunette 42, lock nut means 44 and a lunette mounting member 46. The lunette mounting member comprises an upright bar or plate having a plurality of vertically spaced through sockets or openings 48 for proper vertical positioning of the lunette 42. As shown herein, the mounting member or plate 46 is rigidly attached to the forward end of a pair of channel beams 50 of the tongue of an associated trailer (not shown), with a pair of brace plates 52 interconnecting the member 46 and beams 50.

The lunette 42 comprises a forward eye portion 54, a rear cylindrical threaded shank portion 56 and an intermediate plug portion 58 rigidly interconnecting the eye 54 and shank 56. The eye 54 has a base 60 which presents a rearwardly facing shoulder 62 adapted to butt against the front face 64 of the aforementioned mounting member 46. This shoulder 62 extends around the entire perimeter of the base 60 of the eye 54. As can be seen in FIG. 4, the transverse dimension of the base 60 in a direction perpendicular to the plane occupied by the circular portion 66 of the eye 54 (this dimension being indicated at "$a$" in FIG. 4), is at least one and a half times as great as the thickness dimension of the eye portion 66 (this dimension being indicated at "$b$" in FIG. 4). The other transverse dimension of the base 60, taken parallel to the plane occupied by the eye portion 66 (this dimension being indicated at "$c$" in FIG. 2) is approximately twice as great or moderately more than twice as great as the thickness dimension "$b$" of the circular portion 66 of the eye 54.

The plug portion 58 of the lunette 42 has the configuration of a square rectangular prism aligned with the longitudinal axis of the lunette 42. Thus the plug portion 58 has a substantially uniform, non-circular transverse cross section and presents lateral flat faces 68. The total cross sectional area of the plug portion 58 is less than that of the base 60, and moderately greater than that of the shank 56. Also, the plug portion 58 has a rearwardly facing shoulder portion 70 located around the periphery of the forward end of the shank 56.

The aforementioned lock nut means comprises a nut 72 and an associated French lock washer 74, both of which are in and of themselves of conventional design.

In the assembled position shown in FIG. 3, the lunette eye 54 is positioned forwardly from the mounting member 46, with the rearwardly facing shoulder 62 of the eye 54 bearing against the front face 64 of the mounting member 46. The plug portion 58 of the lunette fits in close mating relationship with a selected one of the several sockets 48, with the several flat surfaces 68 of the plug portion 58 fitting against corresponding surfaces of the sockets. This prevents turning of the lunette 42 about the longitudinal axis thereof, and also assists in resisting torsional loads exerted on the lunette 42. The lock nut assembly 44 is secured to the shank 56 in a conventional manner, with the lock washer 74 bearing against the rear face 76 of the mounting member 46.

When a forward or pulling force is exerted on the lunette eye 54 by an associate pintle (not shown) from a towing vehicle, this results in a tensile load in the shank 56, which is in turn imparted by means of the lock nut means 44 to the mounting member 46 and into the tongue of the trailer. With regard to the transverse loading (either vertically, laterally or a combination of both) exerted on the eye 54 of the lunette 42, it should be noted that both the base 60 of the eye portion 54 and the plug portion 58 have greater cross sectional area than the shank 56. The shear loads between the eye 54 and the plug portion 58 would be resisted primarily at the interface of these two components, and transmitted into the side surfaces of the socket 48 in which the lunette 42 is mounted. However, such transverse loading, having either or both horizontal and vertical components, would most likely also result in torsional or bending stresses imparted to the lunette 42. While the precise manner in which these torsional stresses are transmitted will vary depending on the precise application of the load, it can be stated generally that the surface of the shoulder 62, the side surface 68 of the plug portion 58, the shank 56 and the lock nut means 44 cooperate to resist such torsional or bending stresses and impart the same to the mounting member 46 into the tongue of the trailer.

It is significant to note in the present invention that the lunette 42 is well adapted to being made by a metal casting process. With the particular design configuration of the present invention, the cast metal is able to resist the various tension, shear and compression loads exerted thereon to provide a long life expectancy of the lunette assembly. A typical metal composition for a lunette made according to the present invention is as follows: 152A ASTM A14S Gr. 120/95. Such a cast metal has a tensile yield point of 95 thousand pounds per square inch, an ultimate tensile strength of 125 thousand pounds per square inch, and a Rockwell hardness of 31.

What is claimed is:

1. A lunette assembly for a trailer, comprising:
   a. a lunette mounting member of a trailer tongue, having a forward face, a rear face and a longitudinal circularly irregular through socket extending from the forward face to the rear face of the mounting member,
   b. a unitary lunette secured to said mounting member, said lunette comprising:
      1. a forward eye portion extending forwardly from said forward face of the mounting member and having a rearwardly facing shoulder bearing against the forward face of the mounting member,
      2. a rear shank portion extending rearwardly from the rear face of the mounting member, and
      3. an intermediate plug portion rigidly interconnecting said eye portion and said shank portion, such plug portion having a circularly irregular cross section matching the configuration of the socket of the mounting member and interfitting therewith in mating relationship,
   c. nut means mounted to said shank and securing said lunette to said mounting member.

2. The assembly as recited in claim 1, wherein said plug portion has at least one flat lateral face fitting against a corresponding flat face of the socket of the mounting member.

3. The assembly as recited in claim 2, wherein said plug portion has a substantially uniform square transverse cross section, interfitting with a matching square cross section of the socket of the mounting member.

4. The assembly as recited in claim 1, wherein said eye portion comprises a circular portion and a base portion connecting to the plug portion, said base portion having a transverse cross section substantially larger than that of the circular portion of the eye.

5. The assembly as recited in claim 4, wherein said base portion has a transverse thickness dimension at least approximately twice as great as the thickness dimension of the eye circular portion.

6. The assembly as recited in claim 5, wherein the rearwardly facing shoulder of the lunette eye portion extends substantially circumferentially around the entire plug portion, wherein both vertical and lateral bending forces on the eye portion are resisted at least in part by said rearward shoulder of the eye portion bearing against the forward face of the lunette mounting member.

7. The assembly as recited in claim 6, wherein said nut means bears against the rear face of said mounting member, whereby the rearward shoulder of the eye portion is brought into proper bearing relationship with the forward face of the lunette mounting member.

8. The assembly as recited in claim 1, wherein said lunette is made of cast metal.

9. A lunette adapted to be mounted to a mounting member of a trailer tongue, said lunette comprising:
  a. a forward eye portion having a circular connecting portion and a base, with said base having a rearwardly facing shoulder adapted to bear against a surface of an associated mounting member,
  b. a rear shank portion adapted to have a nut means mounted thereto, and
  c. an intermediate plug portion rigidly interconnecting the eye portion to the shank portion, said plug portion having a circularly irregular transverse cross section adapted to interfit with a mating socket of said mounting member.

10. The lunette as recited in claim 9, wherein said plug portion has at least one flat lateral face adapted to fit against a corresponding flat face of the socket of the mounting member.

11. The lunette as recited in claim 10, wherein said plug portion has a substantially uniform square transverse cross section, adapted to interfit with a matching square cross section of the socket of the mounting member.

12. The lunette as recited in claim 9, wherein said eye portion comprises a circular portion and a base portion connecting to the plug portion, said base portion having a transverse cross section substantially larger than that of the circular portion of the eye.

13. The lunette as recited in claim 12, wherein said base portion has a transverse thickness dimension at least approximately twice as great as the thickness dimension of the eye circular portion.

14. The lunette as recited in claim 13, wherein the rearwardly facing shoulder of the lunette eye portion extends substantially circumferentially around the plug portion, wherein both vertical and lateral bending forces on the eye portion are able to be resisted at least in part by said rearward shoulder of the eye portion being able to bear against the forward face of the lunette mounting member.

15. The lunette as recited in claim 9, wherein said lunette is made of cast metal.

* * * * *